United States Patent [19]

Robertson

[11] Patent Number: 4,848,693
[45] Date of Patent: Jul. 18, 1989

[54] FILM CASSETTE

[75] Inventor: Jeffrey C. Robertson, Rochester, N.Y.

[73] Assignee: Eastman Kodak Company, Rochester, N.Y.

[21] Appl. No.: 193,323

[22] Filed: May 12, 1988

[51] Int. Cl.⁴ .......................................... G03B 17/26
[52] U.S. Cl. .................................... 242/71.1; 354/275
[58] Field of Search ............................... 242/71–71.1; 354/275

[56] References Cited

U.S. PATENT DOCUMENTS

| 988,341 | 4/1911 | Hill | 242/71 |
|---|---|---|---|
| 2,541,476 | 3/1951 | Mihalyi | 242/71 |
| 3,234,024 | 2/1966 | Leinonen | 96/78 |
| 3,659,799 | 5/1972 | Cerutti et al. | 242/71.9 |
| 3,677,499 | 7/1972 | Wangerin | 242/210 |
| 3,797,777 | 3/1974 | Hosino et al. | 242/197 |
| 3,945,584 | 3/1976 | Mangan | 242/71.1 |
| 4,145,133 | 3/1979 | Wareham | 242/71.1 X |
| 4,407,579 | 10/1983 | Huff | 354/275 |
| 4,423,943 | 1/1984 | Gold | 354/275 |
| 4,744,527 | 5/1988 | Coote et al. | 242/71.1 |

Primary Examiner—Stuart S. Levy
Assistant Examiner—Steven M. duBois
Attorney, Agent, or Firm—Roger A. Fields

[57] ABSTRACT

A film cassette is disclosed wherein a spool is rotatable within the cassette shell, a convoluted film roll is wound on the spool, and a pair of flanges are rotatable with the spool. The flanges have respective disks overlying opposite sides of the film roll and respective annular lips circumferentially extending from the disks to radially confine an outermost convolution of the film roll to prevent the outermost convolution from clock-springing against an interior wall of the cassette shell. Each of the annular lips includes an annular constraining section positioned relatively remote from one of the disks and a predetermined radial distance from the spool to enable a lip to contact the outermost convolution of the film roll at a limited location remote from a disk, to radially confine the outermost convolution, and it includes an annular relief section extending from the disk to the constraining section and positioned a predetermined radial distance from the spool, greater than the first-mentioned distance, to enable a lip to avoid contacting the outermost convolution substantially between the disk and the constraining section. This arrangement provides an essentially radial contact between the annular lips and the outermost convolution, thereby preventing any clock-springing of the film roll from generating an axial force against the flanges of the spool.

4 Claims, 4 Drawing Sheets

FILM CASSETTE

CROSS-REFERENCE TO A RELATED APPLICATION

Reference is made to commonly assigned copending U.S. application Ser. No. 173,396, entitled FILM CASSETTE, and filed Mar. 25, 1988 in the names of Jeffrey C. Robertson and Mark D. Fraser.

BACKGROUND OF THE INVENTION

1. Field of the Invention

The invention relates generally to the field of photography and particularly to a film cassette containing roll film.

2. Description of the Prior Art

In conventional 35 mm film manufacturers' cassettes, such as manufactured by Eastman Kodak Co. and Fuji Photo Film Co., Ltd., the filmstrip is wound on a flanged spool which is rotatably supported within a cylindrical shell. A leading end section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, includes a film leader that does not extend outside the cassette shell. The leader, instead, is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the leading end of the filmstrip is reduced in width to allow it to protrude from between the circumferential lips and rest against the shell wall. During initial unwinding rotation of the film spool, the leading end of the filmstrip is advanced to and through a film passageway opening in order to exit the cassette shell. The opening has a width which is slightly less than the width of the filmstrip, thus resulting in the filmstrip being transversely bowed as it is uncoiled from the film spool, and thereby facilitating movement of the film edges under the circumferential lips of the respective flanges. However, transverse bowing of the filmstrip to move its edges under the circumferential lips results in increased friction between the filmstrip and the cassette structure which will impede advance of the filmstrip from the cassette shell and may damage the filmstrip.

THE CROSS-REFERENCED APPLICATION

Like the type of film cassette disclosed in U.S. Pat. No. 4,423,923, the cross-referenced application discloses a film cassette that contains a non-protruding film leader which is automatically advanced to the outside of the cassette shell in response to initial rotation of the film spool in the unwinding direction.

Specifically, there is disclosed a film cassette wherein a convoluted film roll is wound on a spool between a pair of coaxially spaced, independently rotatable flanges. The two flanges have respective circumferential annular lips which prevent the outermost convolution of the film roll from clock-springing into contact with the cassette shell. When the spool is initially rotated, the flanges may remain substantially stationary and the film roll, since its inner end is secured to the spool, tends to expand radially to ensure a non-slipping relation between the outermost convolution and the annular lips. Once the non-slipping relation exists, rotation of the spool will rotate the flanges. This allows stationary internal spreaders to deflect successive portions of the annular lips to an axial dimension exceeding the film width, in turn allowing corresponding portions of the outermost convolution to exit from the radial confinement of the lips without damaging the filmstrip, and to advance to the outside of the cassette shell.

THE PROBLEM

In the film cassette disclosed in U.S. Pat. No. 4,423,923, and the one disclosed in the cross-referenced application, the pair of coaxial flanges associated with the film spool include respective disks overlying opposite sides, i.e. ends, of the film roll wound on the spool, and they include respective annular lips which circumferentially extend from the disks at a 90° angle to radially confine the outermost convolution of the film roll. If the annular lips extend from the disks at an angle greater than 90°, the clock-springing force of the film roll against such a sloped lip, especially in the vicinity of a disk, will create an axial force that can urge the disk firmly against an inside face of the cassette shell. Resultant contact between the inside face and the disk will cause unwanted friction.

SUMMARY OF THE INVENTION

The invention advantageously solves the problem described above by providing an essentially radial contact between the annular lips of the respective flanges and the clock-springing film roll in the film cassette, thereby eliminating the possibility of the film roll generating axial forces against the flanges.

According to the invention, there is provided an improved film cassette wherein (a) a spool is rotatable within a cassette shell, (b) a convoluted film roll is wound on the spool, and (c) a pair of flanges are rotatable with the spool and have respective disks which cover opposite sides of the film roll and respective annular lips which circumferentially extend from the disks to radially confine an outermost convolution of the film roll to prevent the outermost convolution from contacting an interior wall of the cassette shell, and wherein the improvement comprises:

each of said lips including an annular constraining section positioned relatively remote from one of the disks and predetermined radial distance from the spool to enable a lip to contact the outermost convolution of the film roll at a limited location remote from a disk, to radially confine the outermost convolution, and including an annular relief section extending from the disk to the constraining section and positioned a predetermined radial distance from the spool, greater than the first-mentioned distance, to enable the lip to avoid contacting the outermost convolution substantially between the disk and the constraining section.

This arrangement provides an essentially radial contact between each of the lips and the outermost convolution, thereby preventing any clock-springing of the film roll from generating an axial force against the flanges of the spool

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
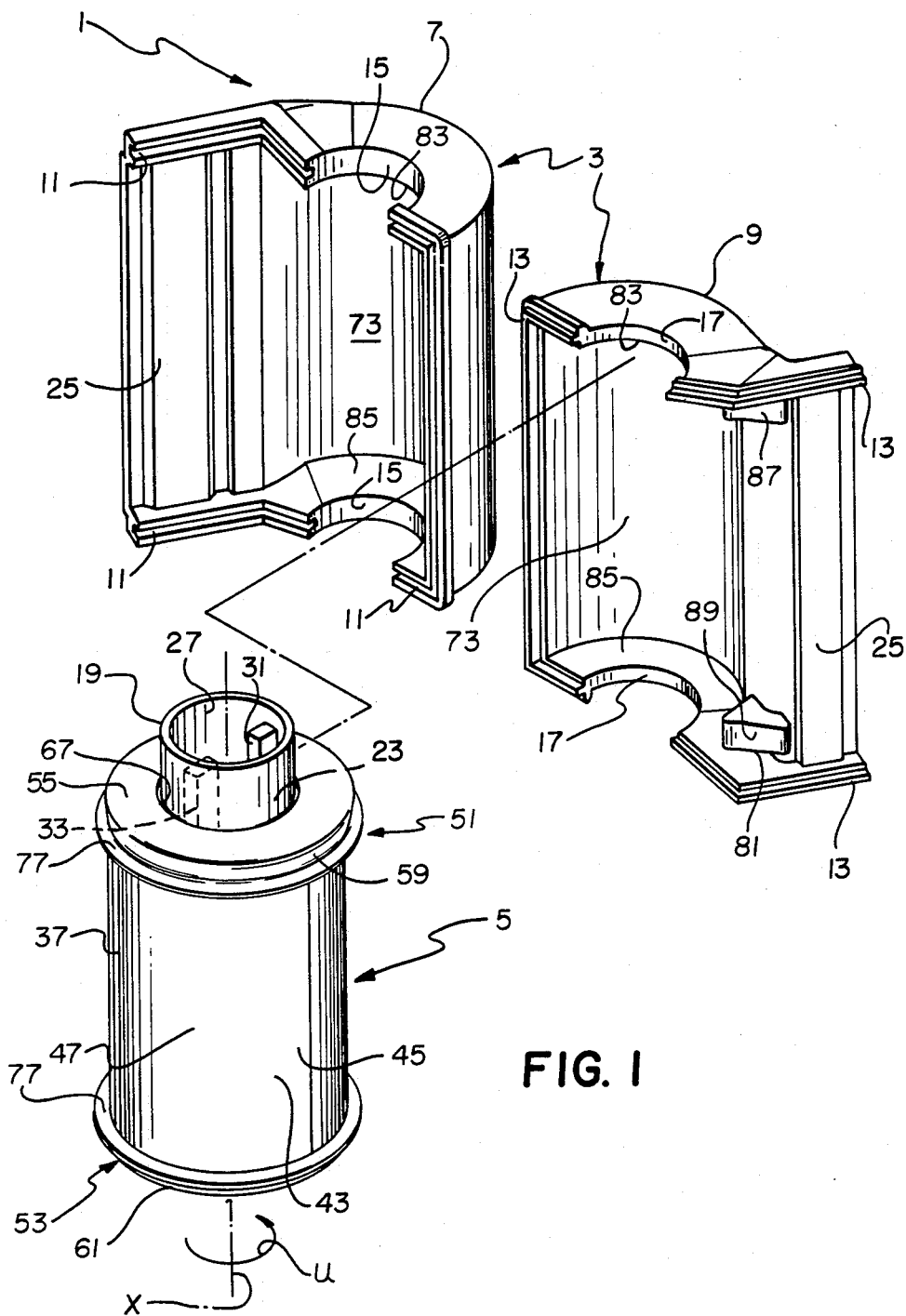
FIG. 1 is an exploded perspective view of an improved film cassette according to a preferred embodiment of the invention.
Figure 2:
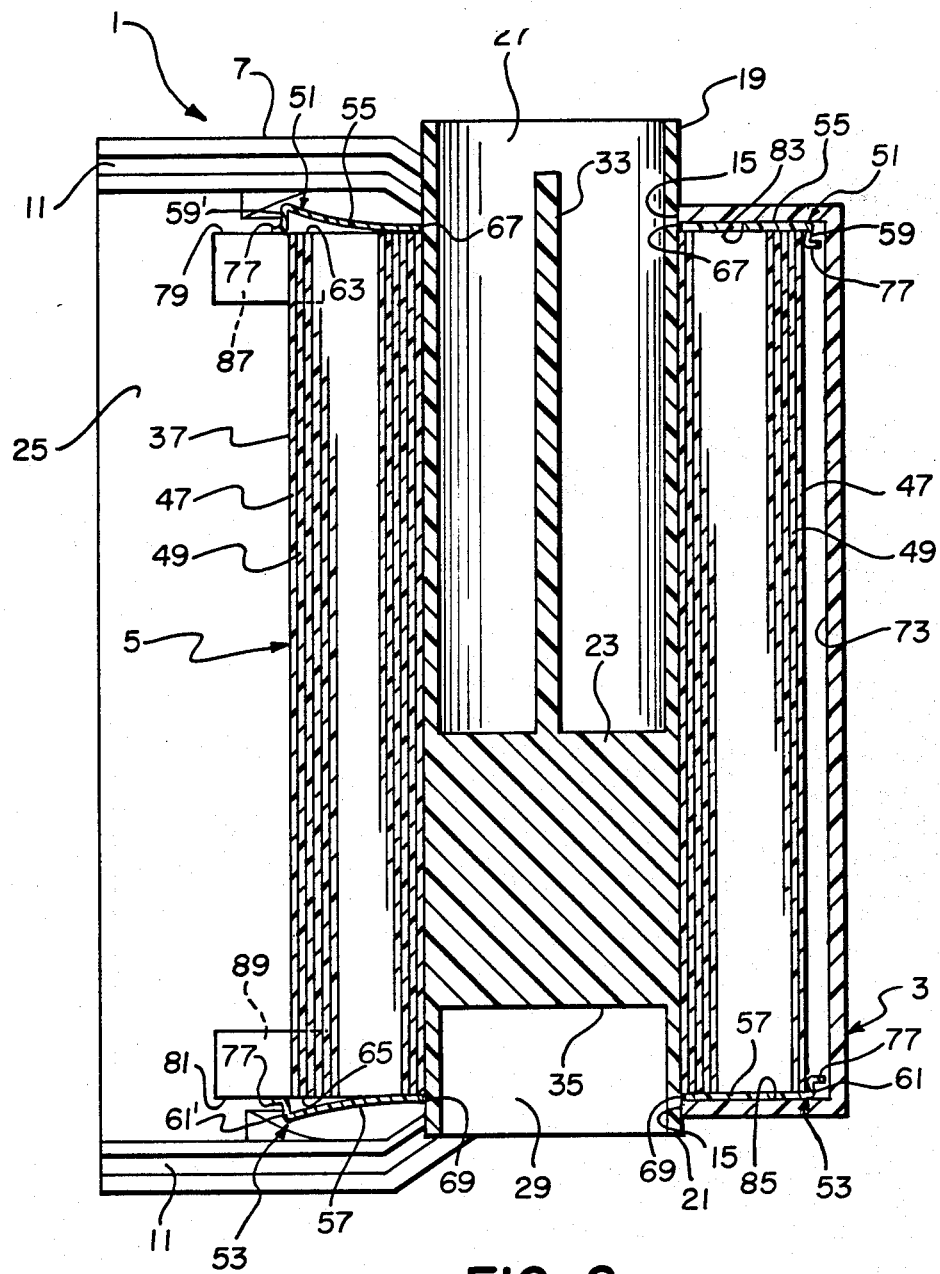
FIG. 2 is an elevation view in cross-section of the improved film cassette.
Figure 3:
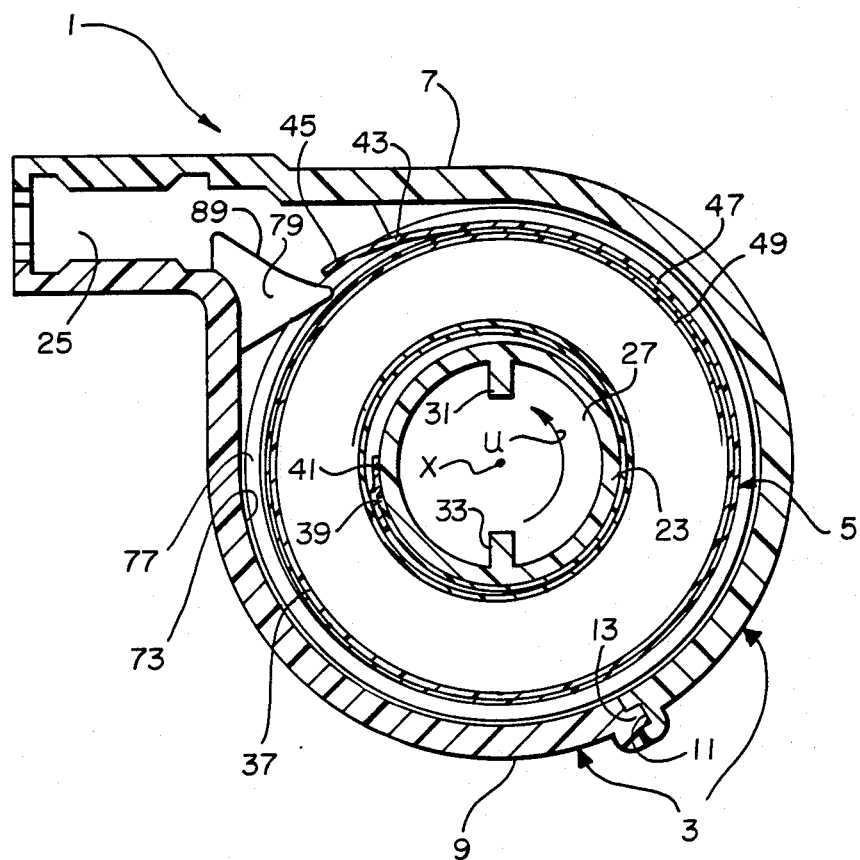
FIG. 3 is an end view in cross-section of the improved film cassette.

Referring now to the drawings, FIGS. 1-3 depict an improved 35 mm film cassette 1 comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a winding direction opposite to the unwinding direction.

A roll 37 of convoluted 35 mm film having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2-3 convolutions of the film roll 37. One of these leader convolutions is the outermost convolution 47 and another of them is the next inward succeeding convolution 49.

Figure 4:
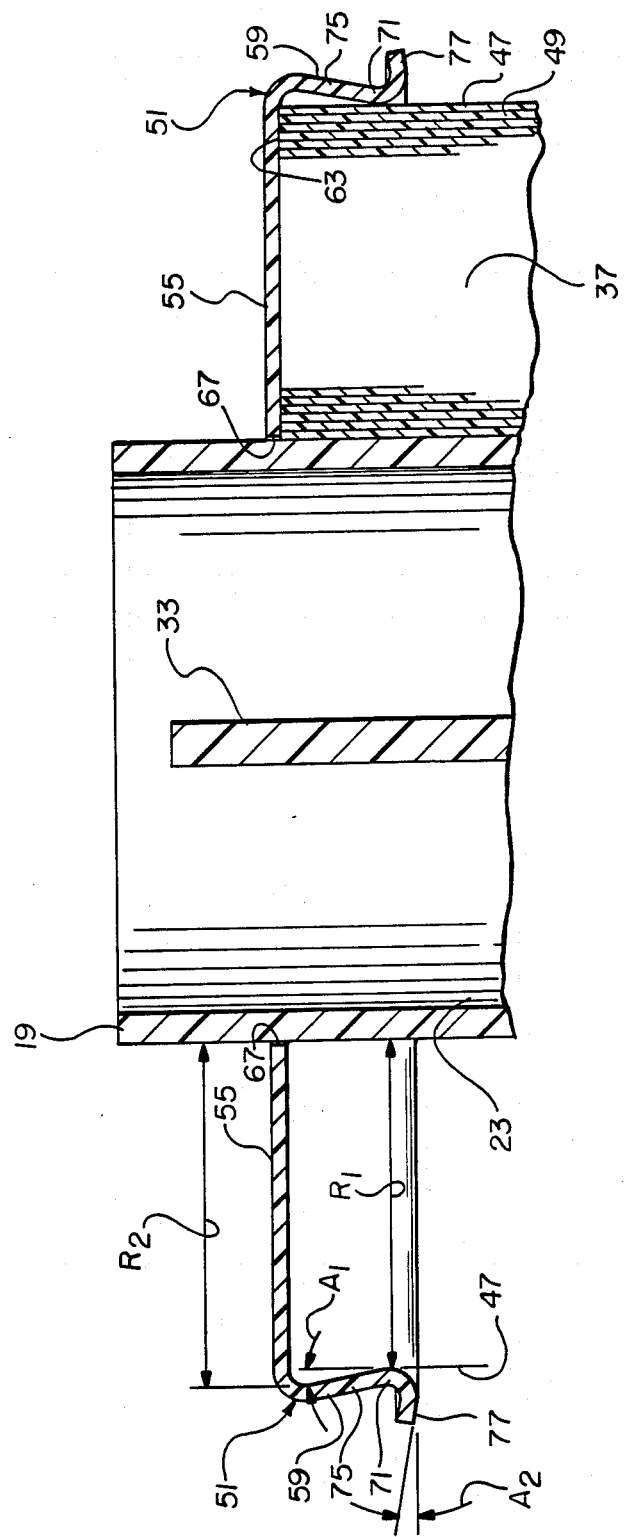
FIG. 4 is an elevation view in cross-section of one of a pair of flanges associated with a spool in the improved film cassette.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned in a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47.

The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45′, for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59′ and 61′ of the annular lips 59 and 61 axially away from each other to an axial dimension slightly exceeding the film width. See FIG. 2. In essence, the deflected portions 59′ and 61′ of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semi-circular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59' and 61' of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1, to position either of the spreader surfaces 79 and 81 relative to an annular free end section.

OPERATION

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59' and 61' of the annular lips 59 and 61 axially away from each other as the respective portions are rotated past the spreader surfaces. The deflected portions 59' and 61' of the two lips 59 and 61 are returned to their original non-flexed condition by the semi-circular flat surfaces 83 and 85 of the cassette shell 3. As can be appreciated form FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

According to the invention, the annular constraining section 71 of each of the annular lips 59 and 61 provides an essentially radial contact between the two lips and the clock-springing film roll 37. This prevents any clock-springing of the film roll from generating an axial force against either of the flanges 51 and 53 which would severely increase the friction between the respective disks 55 and 57 and the semi-circular flat surfaces 83 and 85 of the cassette shell 3.

The invention has been described with reference to a preferred embodiment. However, it will be appreciated that variations and modifications can be effected within the ordinary skill in the art without departing from the scope of the invention. For example, the leading end 45 of the film roll 37 could initially be located within the film passage slit 25 rather than be radially confined by the annular lips 59 and 61 of the two flanges 51 and 53 as shown in FIG. 1. Also, the leading end 45 could be tapered to allow it to freely protrude from between the annular lips 59 and 61.

According to another example, the annular lips 59 and 61 need not be "Z"-shaped or "S"-shaped as shown in FIGS. 2 and 4. Instead, they may have a somewhat different shape. All that is necessary is that the annular lips provide essentially radial contact between themselves and the film roll, without allowing the clock-springing force of the film roll to generate an axial force against either of the flanges 51 and 53.

I claim:

1. An improved film cassette wherein (a) a spool is rotatable within a cassette shell, (b) a convoluted film roll is wound on said spool, and (c) a pair of flanges are rotatable with said spool and have respective disks overlying opposite sides of said film roll and respective annular lips circumferentially extending from said disks to radially confine an outermost convolution of the film roll to prevent said outermost convolution from contacting an interior wall of said cassette shell, and wherein the improvement comprises:

each of said lips including an annular constraining section positioned relatively remote from one of said disks and a predetermined radial distance from said spool to enable a lip to contact said outermost convolution of the film roll at a limited location remote from a disk, to radially confine the outermost convolution, and including an annular relief section extending from said disk to said constraining section and positioned a predetermined radial distance from said spool, greater than the first-mentioned distance, to enable said lip to avoid contacting said outermost convolution substantially between the disk and the constraining section.

2. The improvement as recited in claim 1, wherein said annular relief section of each of the lips is inclined radially inwardly from one of said disks toward said outermost convolution of the film roll to form an acute relief angle with the outermost convolution.

3. The improvement as recited in claim 2, wherein said annular constraining section of each of the lips is curved radially inwardly with respect to said film roll to enable both of said lips to contact said outermost convolution of the film roll in a substantially tangential manner and thereby limit the area of contact between the lips and the outermost convolution.

4. The improvement as recited in claim 3, further comprising:

each of said lips includes an annular free end section inclined radially outwardly from said annular constraining section of a lip and away from said outermost convolution of the film roll.

* * * * *